United States Patent [19]
Karlsson

[11] 3,812,713
[45] May 28, 1974

[54] METHOD AND APPARATUS FOR MEASURING THERMAL PROPERTIES OF A FLOWING MEDIUM

[75] Inventor: Stig Ingvar Karlsson, Karlskrona, Sweden

[73] Assignee: AB Svensk Varmematning CB System, Bramma, Sweden

[22] Filed: May 25, 1972

[21] Appl. No.: 256,925

[30] Foreign Application Priority Data
June 9, 1971 Sweden.............................. 7441/71

[52] U.S. Cl........................... 73/193 R, 235/151.34
[51] Int. Cl. .......................................... G01k 17/10
[58] Field of Search....... 73/193, 92 FL; 235/151.34

[56] References Cited
UNITED STATES PATENTS

| | | | |
|---|---|---|---|
| 3,076,338 | 2/1963 | Peltola................................. | 73/362 |
| 3,537,311 | 11/1970 | Bornstein............................. | 73/193 |
| 3,566,685 | 3/1971 | Zimmerman et al. ................ | 73/194 |
| 3,610,898 | 10/1971 | Yamamoto et al. ........... | 235/151.34 |
| 3,639,737 | 2/1972 | McKee................................. | 73/193 |

*Primary Examiner*—Herbert Goldstein
*Attorney, Agent, or Firm*—Hane, Baxley & Spiecens

[57] ABSTRACT

In a method for measuring thermal properties in a flowing medium, a single voltage pulse is applied to two spaced temperature dependent elements in the medium immediately after a certain volume of the flowing medium has been measured. The differential electrical properties of the elements responding to the differential temperature are then used to give an indication of the thermal properties of the medium.

7 Claims, 4 Drawing Figures

METHOD AND APPARATUS FOR MEASURING THERMAL PROPERTIES OF A FLOWING MEDIUM

This invention refers to a method of measuring the heat exchange of a flowing medium and also relates to apparatus for carrying out the method. The present apparatus is an extension of a previously known temperature and heat quantity indicating arrangement described in the Swedish published application No. 343 946 (Swedish Pat. application No. 2491/68). The purpose of the known arrangement is to measure the temperature difference or the heat quantity of a flowing medium wherein the temperature of the flowing medium is sensed before and after a heat exchange site. The sensing is carried out by means of a temperature difference indicator containing two temperature sensing bodies, each of which can consist of a temperature dependent resistor, To the sensing bodies is connected a temperature difference meter circuit comprising transistors and resistor-capacitor combinations for transmitting a current constituting the difference between the currents through the sensing bodies. Thus through the temperature sensing bodies a certain continuous current flows. The difference current obtained from the temperature difference meter circuit is supplied to an analog-digital converter which delivers a pulse train where the number of pulses per time unit is proportional to the amplitude of the difference current, i.e. the converter delivers a continuous pulse train during the whole measuring period. The pulse trains are supplied to one input of a gate, the second input of which is connected to a pulse generating circuit (clock) which delivers gating pulses having a certain predetermined duration.

The material used in the temperature sensing bodies of the known arrangement can, for example, consist of nickel or of platinum that has a comparatively low temperature coefficient.

With the use of linear resistors (i.e. the relation between the ambient temperature of the resistor and its resistance is linear) as temperature sensing bodies, the difference voltage obtained for a temperature difference of 1° C is 1 % of the measuring current. If it is desirable to indicate temperature differences of the magnitude of 0.01° C where accordingly the difference current amounts to only $10^{-6}$ of the measuring current, the measuring current must be comparatively great. Then the accuracy of the measuring result is limited by the ohmic-heating in the resistor windings of the temperature sensing bodies and by the heat power of the input circuits of the arrangement.

Another limitation of the known arrangement is that the stability of both resistor values and transistors in the measuring circuits is dependent on the load power and the load time to which they are subjected.

Thus for metal film resistors it is possible to expect a stability in the resistance value of unloaded resistors that is ten times better than the stability in the resistance value of resistors with full load.

This invention has for an object the elimination of the influence of the above-discussed drawbacks and limitations of the previously known arrangement and, briefly, the idea of the present invention is to reduce the time during which temperature sensing bodies, difference circuit and analog-digital converters are loaded with measuring current.

The invention, the characteristics of which appear from the appended claims, will be described more fully with reference to the accompanying drawings in which:

Figure 1:
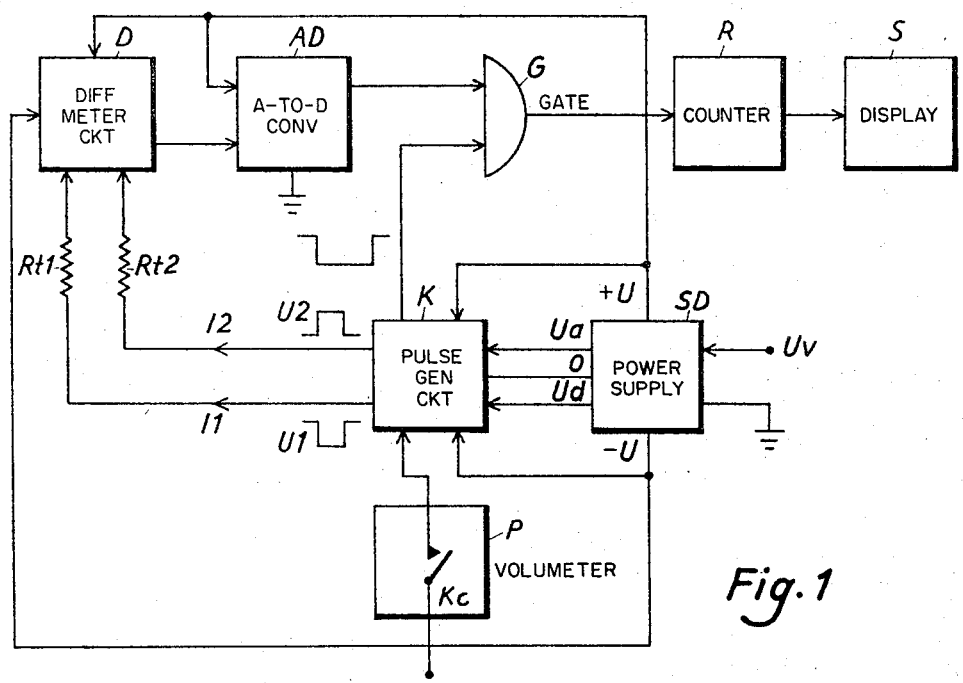
FIG. 1 shows a block diagram of an arrangement for measuring the thermal properties of a flowing medium in accordance with the invention.

In FIG. 1, P indicates a rotating volumeter having a contact which closes at a certain angle of the rotating volumeter, corresponding to the fact that a certain quantity of the flowing medium has passed through the volumeter. This is connected to a pulse generating circuit K, one of the three outputs of which is connected to one of the inputs of a gate G, for example an AND-gate and two outputs are connected to two temperature sensing bodies consisting of temperature dependent resistors Rt1, Rt2. To the pulse generating circuit two out-of-phase voltages, Ua, Ud of line frequency are transmitted. The voltages Ua and Ud are obtained from a power supply unit SD which is fed by a voltage Uv of line frequency. The voltage Ua is obtained from one of the terminals of the secondary winding of a power transformer included in the power supply unit SD, the primary winding of the transformer being fed by the power voltage Uv. From the other terminal the voltage Ud is obtained. The center tap of the secondary winding is connected to ground potential. The secondary winding itself is connected to a rectifier bridge, on the output of which the direct-current voltages +U and −U respectively are obtained. These two direct current voltages are supplied to the pulse generating circuit K and the voltage +U to the analog-digital converter AD as a bias voltage. The positive and the negative peak values of Ua and Ud are about 1.5V above or below the direct-current voltages +U and −U, for reasons which will appear later in connection with the description of the circuit, K. The pulse generating circuit the structure of which essentially differs from the structure of the known arrangement and which will be described more closely in connection with FIG. 3 delivers voltage pulses U1 and U2, respectively, to each of the resistors Rt1, Rt2, of a certain duration and preferably having mutually opposite polarities. The voltage pulses U1, U2, are delivered simultaneously and at the same moment as a voltage pulse of longer duration than the voltage pulses U1, U2 is delivered to the gate G. These voltage pulses are delivered by the pulse generating circuit when a pulse from the volumeter indicates that a certain quantity of the flowing medium has passed.

The voltage pulses give rise to pulse shaped currents I1 and I2 to the resistors Rt1 and Rt2. In dependence on the temperature of the surrounding medium the current pulses have different amplitudes. The difference meter circuit D, connected to the resistors Rt1, Rt2 forms the difference value of the currents I1, I2 and this value is fed to the analog-digital converter AD which converts, in accordance with the previously known arrangement, the analog difference value I2-I1 to a pulse train during a time interval that is at most equal to the pulse duration of the voltage pulses U1, U2. The pulse train is fed to the other input of the gate G which opens at the same moment as the pulse from the pulse generating circuit activates one of its inputs. The electronic counter R accumulates the number of pulses from the gate G which number is equal to the number of pulses obtained from the converter AD during the measuring time which is determined by the duration of the voltage pulses U1, U2. The counter can be connected to an indicator S.

Thus according to the invention the temperature dependent resistors Rt1, Rt2 are loaded only during a certain short time interval, corresponding to the measuring time, differently from the previously known arrangement in which the circuits were permanently loaded with the measuring current. Consequently, a measuring time is determined corresponding to the duration of a voltage pulse U1, U2. This implies that it could be possible to omit the gate G, since in the previously known arrangement it controlled the time when pulses were to be transmitted from converter AD, viz. the measuring time. The gate G is however maintained also in this case as a precaution. The measuring time is namely so short in relation to the total time during which the measuring procedure takes place that separate error pulses from the converter AD between the different measuring times would have an influence on the measuring result. It should be observed that when the pulse duration of the difference voltage has been chosen to a certain value it is obvious for the man skilled in the art to select the time of the pulse that is delivered from the pulse generating circuit K to the gate G. This pulse must however be at least equal to the duration of the difference current pulse.

Figure 2:
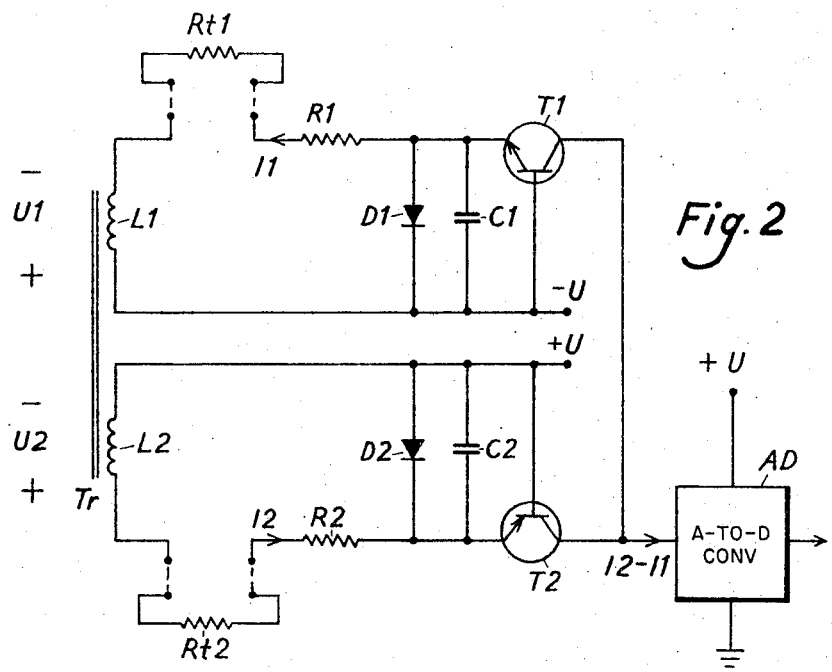
FIG. 2 shows a circuit diagram of the temperature difference meter circuit included in the arrangement according to FIG. 1.

FIG. 2 shows an example of an embodiment of the difference circuit D. This consists of two mutually equal transistor circuits for which reason only the one that includes the temperature dependent resistor Rt1 is described in detail. The transformer Tr the secondary windings L1 and L2 of which have been shown in the figure is included in the pulse generating circuit K but has been shown here for the sake of clarity. Each terminal of the windings L1 and L2 is connected to the voltage +U, −U. The base of the transistor T1 is connected to the voltage −U, for which reason this transistor operates in its active region when a negative voltage pulse U1 appears across the secondary winding L1. At that time a current I1 will flow through the transistor T1, the resistance R1, the temperature dependent resistor Rt1 and the secondary winding L1 back to the negative terminal − U. The current I1 will be, like the voltage U1, pulse shaped and with an amplitude that is determined by the resistance value of element Rt1, i.e. by the ambient temperature. Across the base-emitter circuit of the transistor T1 there is located as a protection a diode D1 and a capacitor C1 for short-circuiting of the high frequency components in the current. The transistor T2 of the other stage of the difference circuit is of an opposite conduction type relative to the transistor T1 and its base is connected to the voltage +U. In this way the transistor works in its active region upon the appearance of a positive voltage pulse U2 across the secondary winding L2. The collectors of the transistors are connected in a common point, in consequence of which a pulse shaped difference current I1-I2 is obtained which is fed to the following analog-digital converter AD.

Figure 3:
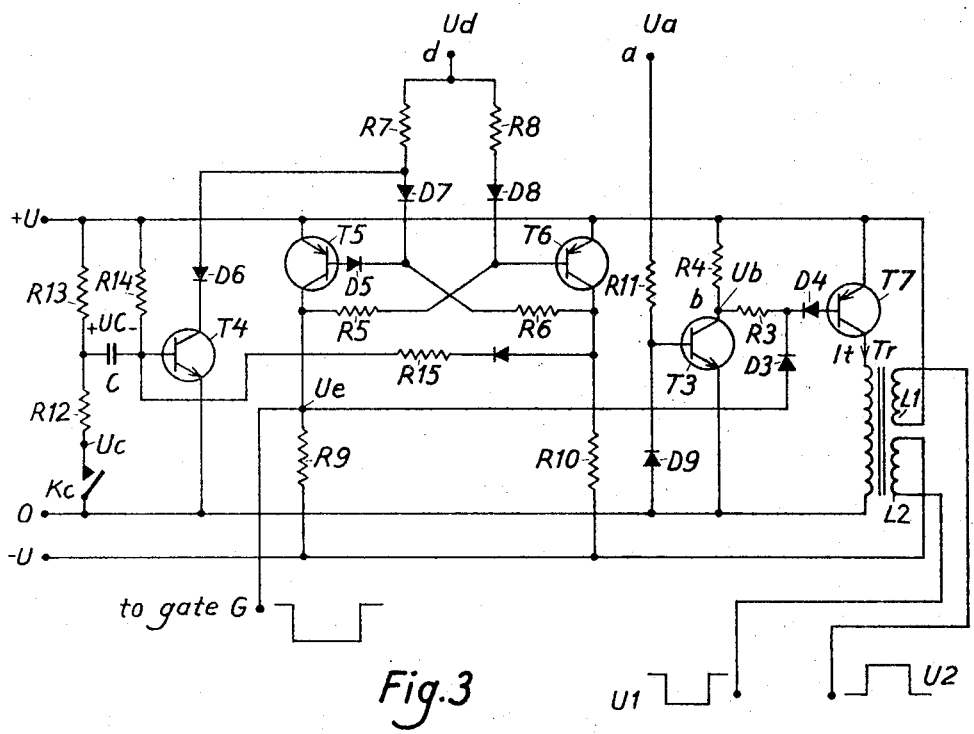
FIG. 3 shows the circuit diagram of the pulse generating circuit included in the arrangement according to FIG. 1.

With reference to FIG. 3 an embodiment of the pulse generating circuit K according to FIG. 1 will now be described. The pulse generating circuit includes a bistable circuit comprising the transistors T5, T6, the diodes D5, D7, D8 and their associated resistors. The bistable circuit is biassed by means of the direct-current voltages −U, +U and is triggered by means of a main voltage of the frequency such as 50Hz across the terminal d (compare FIG. 1). The voltage to the negative terminal −U appearing across the resistor R9 is supplied to one of the inputs of the gate G. The pulse generating circuit comprises furthermore three different transistor stages, of which stages the first one consists of the transistor T3 with its associated resistors R3, R4. The second transistor stage consists of the transistor T7 which has an opposite conduction type relatively to the transistor T3 and the base of which is connected via the diode D4 to the resistor R3 in the first transistor stage and the collector of which is connected to the primary winding of the transformer Tr. The secondary windings of this transformer are connected to each of the temperature dependent resistors Rt1, Rt2. A diode D3 connects the collector of one of the transistors T5 of the bistable circuit to the junction point between the diode D4 and the resistor R3 in the first transistor stage. In the first transistor stage a voltage Ua of main frequency (50 Hz) is fed via the resistor R11 to the base of the transistor T3. Diode D9 is connected to zero potential 0 and to the junction point between the resistor R11 and the base of the transistor T3. Hence, this base will be connected to zero potential for negative half periods of Ua. The third transistor stage consists of the transistor T4, connected with its emitter electrode to the zero potential 0 and with its collector electrode via the diode D6 and the resistor R7, to the main voltage Ud. The base of the transistor T4 is connected to the junction point between the resistors R12, R13 via the capacitor C. Between the base of the transistor T4 and the positive terminal +U a resistor R14 is connected. The resistors R12 and R13 form a voltage divider which is connectable between the zero potential 0 and the positive terminal by means of the contact Kc. This contact is included in the volumeter P according to FIG. 1 but is shown in FIG. 3 in order to show clearly its mode of operation. The pulse generating circuit according to FIG. 3 is intended to work in such a way that when the contact Kc is closed, i.e. when a predetermined quantity of the flowing medium has been measured by the voltmeter P, a voltage pulse of a certain duration should appear across each of the secondary windings L1, L2 of the transformer Tr and, before that, a voltage pulse of at least equally long duration should appear across the resistance R9. In the present embodiment of the pulse generating circuit K, a negative pulse of 20 ms duration will appear, as it will be shown below, across the resistance R9 and which pulse is fed to the gate G while the voltage pulses U1, U2 are of opposite polarity and of a duration of 10 ms, dependent on the fact that the main frequency is 50 Hz these times would be different for other line frequencies such as 60 Hz.

The pulse generating circuit K operates in the following manner. When the contact Kc is open, the transistor T4 is in its conductive state because its base-emitter circuit is biassed in the forward direction. The base current required is obtained from the positive terminal +U via the resistor R14. The capacitor C is charged across the resistor R13, so that UC=+U. Thus the transistor T4 and the diode D6 constitute a low-ohmic path for the current through the resistor R7 from the terminal d. Thus the current is shunted around that part of the bistable circuit which contains the transistor T5 for positive half periods of the voltage Ud. When the contact Kc is closed, the capacitor C will be connected with its left plate to near zero potential via the resistor R12 and for this reason its polarity is reversed so that the potential of the base electrode of the transistor T4 becomes negative, in consequence of which this transistor is blocked. The transistor T4 and the diode D6 will now constitute a high-ohmic path for the current from the terminal d, for which reason the transistor stage containing the transistor T4 does not have any influence on the operation of the bistable circuit.

Figure 4:
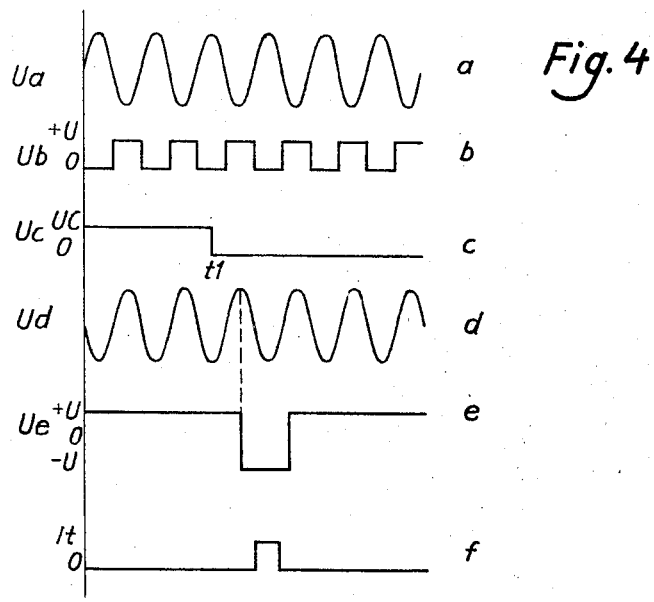
FIG. 4 shows the waveform the voltage in different parts of the circuit according to FIG. 3.

The flip-flop T5–T6 has normally a condition, transistor T5 conducting, transistor T6 non-conducting, dependent on the fact that the transistor T6 for each positive voltage peak of Ud is blocked via the resistor R8 and the diode D8. The transistor T5 is not blocked, since the normally conducting transistor T4 forms a connection circuit R7-D6-T4 to the zero potential 0, in consequence of which the voltage in the junction point between the resistor R7 and the diode D7 essentially cannot exceed 0 V. Thus in the normal case when the contact Kc is open, the transistor T4 is conducting and the flip-flop is in the condition, transistor T5 and transistor T6 conducting and non-conducting respectively, in consequence of which the potential Ue is high (approximately equal to +U). See FIG. 4.

At the time t1 when the contact Kc is closed, the transistor T4, according to what has been mentioned previously, will be blocked, in consequence of which the connection circuit consisting of this transistor and the diode D6 is blocked for the current from the terminal d. If the main voltage Ud then is negative as it is indicated in FIG. 4d, compare FIG. 4c, the diodes D7 and D8 are both blocked and no change in the condition of the flip-flop will take place. When the main voltage Ud becomes positive, when both transistors T5 and T6 will be blocked at the voltage peak of the main voltage, dependent on the fact that the voltage Ud exceeds +U by about 1.5V. When the main voltage Ud has passed its peak value and decreases, then the blocking state of transistor T5 remains for a little longer time than the blocking state of transistor T6 dependent on the asymmetry in the flip-flop which is formed by the diode D5. Until the next positive voltage peak of the main voltage Ud the flip-flop will be in the condition, transistor T5 non-conducting, transistor T6 conducting, i.e. the opposite condition to the normal one. This condition causes the potential Ue to be negative (compare FIG. 4e).

When the contact Kc is closed, the transistor T4 is blocked during a time determined by the value of the capacitor C and the resistance of resistor R14, the time constant of which is selected to be greater than 20 ms. When the main voltage Ud again is positive, the flip-flop would remain in its condition so that the transistor T5 is non-conducting and the transistor T6 is conducting. Since T6 is conducting the resistor R14 will however be shunted by the resistor R15, and for this reason the time constant determining the blocking state of the transistor T4 will be reduced to less than 20 ms. Therefore, the transistor T4 becomes conducting before the voltage Ud has again reached its positive peak value and for this reason the bistable circuit is again shunted by said connection circuit. This implies, according to the above, that the transistor T5 will be again conducting and the transistor T6 non-conducting so that the transistor T5 is conducting one and only one time during a time interval of 20 ms, dependent on the make time of the contact Kc. Thus the potential Ue is negative during a time interval of about 20 ms.

The transistor T3 is included in an over-driven amplifier stage that converts the sine wave voltage Ua into a square wave voltage Ub (see FIG. 4a,b). The square wave voltage Ub is in opposite phase to the sine wave voltage Ua, i.e. in phase with the main voltage Ud. The amplitude of voltage Ub changes its value between 0 and +U. During the positive half period of the sine wave voltage Ua, Ub is low and transistor T7 could be brought to its conducting condition by means of current through the resistor R3 and the diode D4. This is however prevented because the diode D3 is conducting as long as the potential Ue is positive, and consequently the diode D4 is non-conducting.

As however the potential Ue is negative during a time interval of about 20 ms as it has been described above, the blocking of the diode D4 ceases and the transistor T7 conducts during the positive half period of the voltage Ua that lies within this time interval. Consequently a current pulse It, compare FIG. 4f, passes through the secondary windings L1 and L2 of the transformer Tr and the two voltage pulses U1 and U2 are induced, the amplitudes of which are determined by the amplitude of the voltages +U, −U.

In a practical embodiment of the arrangement having a circuit according to FIG. 2, R1=R1=400 Ω and Rt1 and Rt2 consisting of nickel resistors having a resistance of 100 Ω at 0° C and a temperature coefficient of the magnitude 0.0067 (DIN 43760) a linearity better than 1°/oo was achieved. The analog-digital converter AD then is of such a known type that compensates for changes in the voltage +U.

The method according to the invention is not limited to the type of measuring arrangement described above where the temperature difference is indicated as the difference between two currents but can also be applied to measuring arrangements where the temperature dependent resistors can be connected into a bridge, the difference in the voltages across the temperature dependent resistors being indicated.

The proposed arrangement implies that the temperature sensing bodies, difference circuit and analog-digital converter operate during a considerably shorter time than at the known arrangement. The pulse contact Kc of the volumeter P closes with a repetition rate that is maximally 80 per hour, which implies a load time of 0.8 s per hour or 2 hours per year. Accordingly an improved stability of the above mentioned circuits will be achieved besides which the self-heating in temperature sensing bodies and the heating drive in the input circuits is practically eliminated.

What is claimed is:

1. A method of measuring the heat exchange of a flowing medium comprising the steps of measuring the volume flow rate of the flowing medium, indicating each predetermined volume of said flowing medium, measuring the temperature in at least two regions of said medium during a certain measuring time interval by impressing during said interval after each indication of said predetermined volume, a single voltage pulse across each of at least two temperature sensitive elements located respectively in said regions, said voltage pulse occurring during a period which is much smaller than the time interval between two successive indications of said predetermined volume, forming the difference between the magnitudes of the currents through said elements caused by said voltage pulse, converting the difference thus obtained to a train of pulses having a repetition rate which is proportional to the magnitude of said difference current and accumulating said pulses during a time defined by said measuring time interval.

2. A method as claimed in claim 1 in which the polarity of the voltage pulse impressed on one of said temperature sensitive elements is opposite that impressed on another one of said temperature sensitive elements.

3. An apparatus for measuring the thermal properties of a flowing fluid comprising: temperature dependent elements for generating, in response to a voltage pulse, first and second electric currents which are proportional to the temperature at first and second regions of said flowing fluid; differential means for generating the difference current of the first and second electric currents which represents the temperature difference between said two regions; analog-to-digital conversion means for converting said difference current into a first pulse train with a pulse repetition rate proportional to the amplitude of said difference current; a volumeter means for measuring predetermined volumes of the flowing fluid and including a first means which is activated when each said predetermined volume has been measured; pulse generating means controlled by said first means in said volumeter means for transmitting voltage pulses to said temperature dependent elements; a gating means having a first input connected to said analog-to-digital conversion means and a second input connected to an output of said pulse generating means; a first alternating voltage source; a second alternating voltage source which is phase shifted relative to the first alternating voltage source; said pulse generating means comprising a bistable flip-flop circuit having control inputs connected to said first alternating voltage source and being adapted to transmit for each volume indication an output voltage pulse to the second input of said gating means the duration of said output pulse being equal to the period of said alternating voltages, a shunt circuit means connected to said bistable flip-flop circuit for preventing the bistable flip-flop circuit from producing said output voltage pulse until switched by said first means and allowing only one such pulse per activation of said first means, a pulse generator circuit connected to said second alternating voltage source, said pulse generator circuit generating pulses which have the same frequency as said first alternating voltage source, and an output circuit connected to said pulse generator circuit and said bistable flip-flop circuit in order to produce from one of the pulses generated by said pulse generator circuit a single voltage output pulse from said bistable flip-flop circuit for transmission to said temperature dependent elements.

4. Apparatus as claimed in claim 3 wherein said bistable flip-flop circuit includes two alternately conducting and non-conducting current branches, each comprising a transistor, a resistor connected in series, a diode and a first resistor, the base of one of the transistors being connected via said diode and said first resistor to the collector of the second transistor and a second resistor, the base of the second transistor being connected via said second resistor to the collector of the first transistor.

5. Apparatus as claimed in claim 3 wherein said pulse generator circuit includes a first resistor, a first transistor having base connected via said first resistor to said second alternating voltage source, a diode, a second transistor having a base connected via said diode to the collector of the first transistor and a collector connected to said output circuit, another diode, one of the electrodes of said diode being connected via said other diode to the output of bistable flip-flop circuit.

6. Apparatus as claimed in claim 3 wherein said shunt circuit comprises a connection circuit including a diode, a transistor having an emitter connected to a reference potential and a collector connected to the cathode of said diode whose anode is connected to said first alternating voltage source, a capacitor, the base of the transistor being connected to one of the plates of said capacitor, a voltage divider, a direct-current source connected thereto, means for connecting the other plate of said capacitor to a point on said voltage divider and said first means by said volumeter.

7. Apparatus as claimed in claim 3 wherein said output circuit includes a transformer having at least two secondary windings each of which is connected to a different one of said temperature dependent elements.

* * * * *